(12) United States Patent
Nicholson et al.

(10) Patent No.: US 12,717,847 B2
(45) Date of Patent: Aug. 25, 2026

(54) TRANSFER OF REFINED QUERY TO DIFFERENT QUERY RESPONDER

(71) Applicant: Lenovo (United States) Inc., Morrisville, NC (US)

(72) Inventors: John W. Nicholson, Cary, NC (US); Daryl C. Cromer, Raleigh, NC (US); Howard Locker, Cary, NC (US); Xiaohua Xu, Raleigh, NC (US)

(73) Assignee: Lenovo (United States) Inc., Morrisville, NC (US)

( * ) Notice: Subject to any disclaimer, the term of this patent is extended or adjusted under 35 U.S.C. 154(b) by 12 days.

(21) Appl. No.: 18/897,909

(22) Filed: Sep. 26, 2024

(65) Prior Publication Data

US 2026/0087074 A1 Mar. 26, 2026

(51) Int. Cl.
*G06F 16/903* (2019.01)

(52) U.S. Cl.
CPC .............................. *G06F 16/90335* (2019.01)

(58) Field of Classification Search
None
See application file for complete search history.

(56) References Cited

U.S. PATENT DOCUMENTS

| | | | | |
|---|---|---|---|---|
| 9,589,050 | B2 * | 3/2017 | Tao | G06F 16/334 |
| 2015/0286708 | A1 * | 10/2015 | Tao | G06F 16/3344 707/730 |
| 2024/0210194 | A1 * | 6/2024 | Sharifi | G10L 15/22 |
| 2024/0354336 | A1 * | 10/2024 | Gopalkrishna | G06F 16/532 |
| 2025/0342184 | A1 * | 11/2025 | Wu | G06F 16/3329 |
| 2025/0348479 | A1 * | 11/2025 | Yu | G06F 16/2425 |
| 2025/0348485 | A1 * | 11/2025 | Kulkarni | G06F 16/24542 |
| 2025/0355890 | A1 * | 11/2025 | Srivastava | G06F 16/254 |
| 2026/0087074 | A1 * | 3/2026 | Nicholson | G06F 16/90335 |

OTHER PUBLICATIONS

Interactive Query Refinement (Year: 2009).*
A Unified and Discriminative Model for Query Refinement (Year: 2008).*

* cited by examiner

*Primary Examiner* — Kim T Nguyen
(74) *Attorney, Agent, or Firm* — FERENCE & ASSOCIATES LLC

(57) ABSTRACT

One embodiment provides a method, the method including: receiving a query from a user at a first query response system; creating, using the first query response system, a refined query by iteratively receiving, from the user, refinements to the query subsequent to responses provided by the first query response system; and transferring, responsive to receiving an indication from the user to transfer the refined query, the refined query from the first query response system to a second query response system. Other aspects are claimed and described.

20 Claims, 3 Drawing Sheets

TRANSFER OF REFINED QUERY TO DIFFERENT QUERY RESPONDER

BACKGROUND

Artificial intelligence systems are becoming more sophisticated which is allowing them to be more accessible to more and more people. Specifically, the technology has increased so that artificial intelligence systems are able to digest human language and provide responses to such queries in a manner that mimics human language. This has allowed the advent of generative artificial intelligence (AI) models where a user can provide a query or prompt within a user interface of the generative AI model and receive a response from the generative AI model that is not only responsive to the query or prompt, but is also responsive in a way that mimics human language or that can produce images that were not previously available. Additionally, the generative AI model interfaces allow a user to provide queries or prompts that build from a response provided from the model and receive responses from the generative AI model that are not just based upon the immediately preceding query or prompt, but that is based upon any preceding queries or prompts that are related. Thus, these generative AI systems allow a user to effectively have a conversation with the generative AI model.

BRIEF SUMMARY

In summary, one aspect provides a method, the method including: receiving a query from a user at a first query response system; creating, using the first query response system, a refined query by iteratively receiving, from the user, refinements to the query subsequent to responses provided by the first query response system; and transferring, responsive to receiving an indication from the user to transfer the refined query, the refined query from the first query response system to a second query response system.

Another aspect provides a system, the system including: a processor; a memory device that stores instructions that, when executed by the processor, causes the system to: receive a query from a user at a first query response system; create, using the first query response system, a refined query by iteratively receiving, from the user, refinements to the query subsequent to responses provided by the first query response system; and transfer, responsive to receiving an indication from the user to transfer the refined query, the refined query from the first query response system to a second query response system.

A further aspect provides a product, the product including: a computer-readable storage device that stores executable code that, when executed by a processor, causes the product to: receive a query from a user at a first query response system; create, using the first query response system, a refined query by iteratively receiving, from the user, refinements to the query subsequent to responses provided by the first query response system; and transfer, responsive to receiving an indication from the user to transfer the refined query, the refined query from the first query response system to a second query response system.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
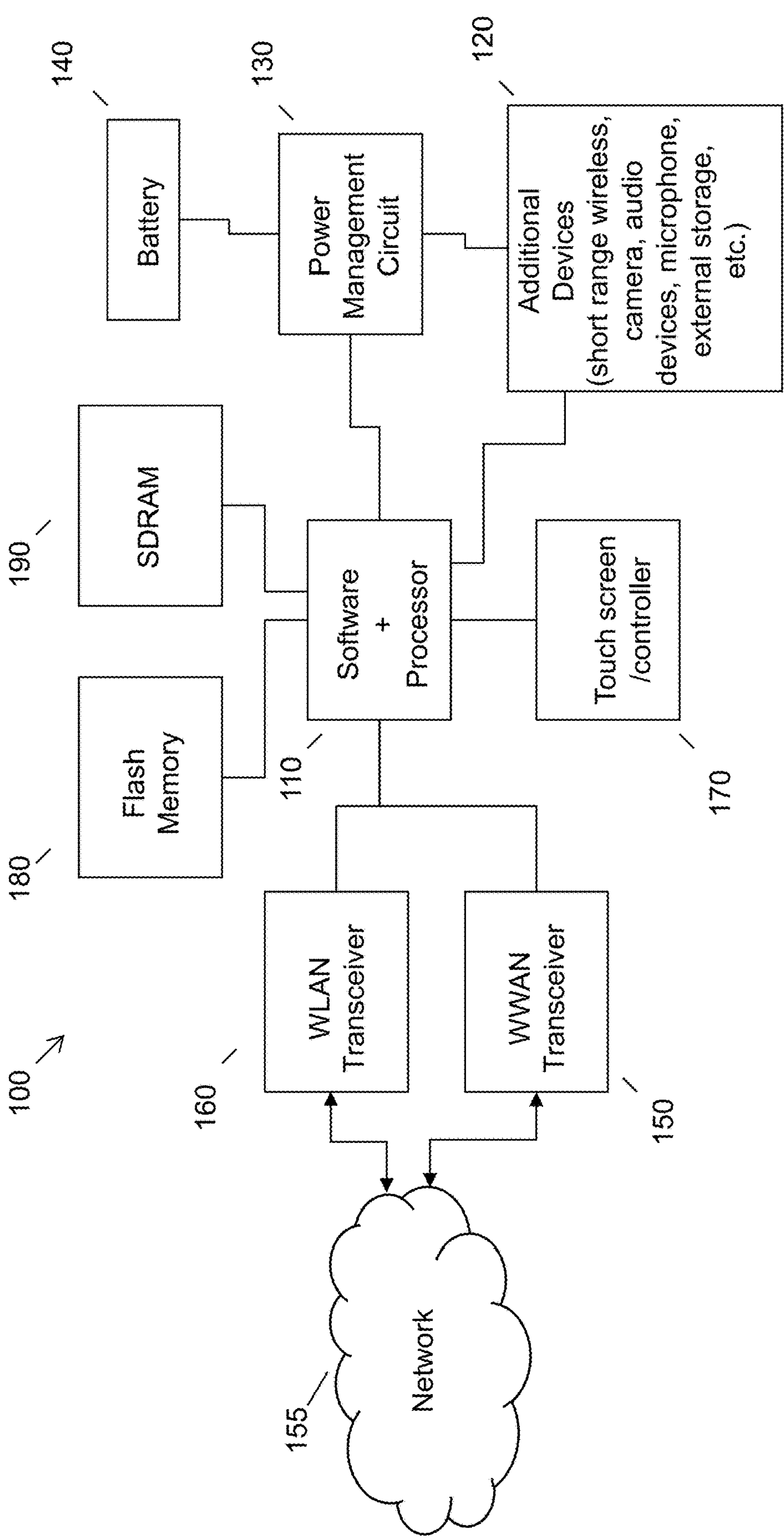
FIG. 1 illustrates an example of information handling device circuitry.

Since generative artificial intelligence (AI) is relatively new, use of generative AI interfaces is still increasing. Additionally, as additional prompts are received at an AI model interface, the additional prompts can be added to the training dataset to further train the AI models using larger and better datasets. Thus, entities that support AI models and, particularly, generative AI models have incentive to increase the use of the generative AI interfaces so that the models can become better and more accurate. In other words, entities want people to use the models so that the entities essentially receive free training of the AI models. Thus, use of generative AI models has mostly been free or subscription based. The subscription-based services allow a user to pay a fee for a predetermined length of time (e.g., weekly, monthly, quarterly, annually, lifetime, etc.) and utilize the AI model interface for as many queries or prompts as the user wants during that predetermined length of time. Similarly, free services allow users to utilize the AI model interface for as many queries or prompts as the user wants.

However, AI models require significant time and resources to develop the models and significant computational resources to process and respond to user queries and prompts. Accordingly, as more and more people utilize the AI model interfaces and/or provide more and more queries and prompts, it will be more and more expensive for entities to support the AI models and corresponding interfaces. At some point, the cost of supporting the models and interfaces will begin to outweigh the benefits received from providing the free service or even through the subscription-based service. Accordingly, it is not hard to imagine that generative AI interfaces will become a pay-as-you-go service, particularly when the AI models and interfaces become more accurate, more powerful, and better as compared to current AI models and interfaces.

The problem with a pay-as-you-go service model is that it will cost users for every query or prompt provided to the system. Thus, users will want to decrease the number of queries or prompts that are provided to the AI system in order to reduce the cost of receiving responses. However, it is sometimes difficult to get a prompt or query exactly right on the first try. Users may not understand how the AI system will respond to a particular query or prompt. Thus, the response received to a particular prompt or query may not be exactly what the user was expecting or looking for. Additionally, users may have a rough idea of what they want, but it may not be a complete idea. The benefit with the AI system is that a user can iteratively refine a query or prompt based upon responses by provided by the system. In other words, upon receiving a response by the AI system, the user can provide an additional prompt or query and get the AI system to modify the previously provided response. The user can continue to do this until they are satisfied with the end response. Accordingly, it may take multiple queries or prompts in order to receive the desired response or refine the prompt or query to receive a response the user is satisfied with. However, this can be costly with a pay-as-you-go service model.

Accordingly, the described system and method provides a technique for creating a refined query from a query received by a user based upon refinements provided by the user to responses from a first query response system and transferring the refined query to a second query response system. The system receives a query from a user at a first query response system. For ease of readability, the discussion will focus on generative AI systems and text-based queries having a text-based response. However, this is merely illustrative and is not intended to be limiting as any type of system that can accept queries and prompts and respond to them can be utilized. The first query response system may be a first generative AI system, a first AI system, a first query search engine, a first virtual assistant, and/or any type of system that can receive and respond to queries or prompts. Additionally, any type of query modality and response modality may be utilized, for example, provision and receipt of images and videos, provision and receipt of audio, provision and receipt of gestures, and/or the like, or a combination thereof.

The first query response system responds to the query and provides that response to the user, for example, in a graphical user interface, via an audio output device, on a display, via a haptic output device, and/or the like, or a combination thereof. Upon receiving the response, the user may determine that the query should be modified and refined. In other words, the user may not be satisfied with the response for one or more reasons and may determine that more queries or prompts should be provided in order to obtain the desired response. Accordingly, the user provides refinements to the query. These refinements may include modifications to the original query or may include provision of additional information in the form of a query or prompt that should be utilized by the system in addition to the original query. Refinements may also include a combination of both modifications and additional information. The system then responds to the refinements and provides a new response, which may be different than the original response or may be the original response with modifications.

This process of the user providing refinements and the system providing responses can continue until the user is satisfied with the last response provided by the system. In other words, the process of refinement of the query and receipt of responses is an iterative process that continues until the user is satisfied. Once the user is satisfied, the user can provide an indication to transfer the refined query from the first query response system to a second query response system. While the second query response system is of the same type as the first query response system, the second query response system may have different characteristics or capabilities as compared to the first query response system. For example, the second query response system may be more powerful, may have access to more resources or data storage locations, may be larger, may be more expensive to utilize, may be stored or housed at a different storage location, and/or the like, or a combination thereof, as compared to the first query response system. When transferring the query to the second query response system, the system can not only transfer the refined query, but also the original query and any intermediary queries, any context that has been built up by the first query response system, any responses that have been provided by the first query response system, and/or the like.

As an overall example utilizing a text-based query and text-based response, the user may be utilizing a generative AI system as the query response system. The user may utilize a first-free generative AI system and provide a prompt to write a short story about a doctor traveling to a foreign country to live and train for a year. The first generative AI system may provide a responsive text-based output. However, the user may not be satisfied with the response because the user would like more specific details regarding the type of doctor, the foreign country, and additional details regarding the types of health conditions patients of the doctor are experiencing. Accordingly, the user may provide this refining input to the generative AI system, causing the AI system to provide a new response taking into account the refinements provided by the user. This process may end here or may continue in an iterative fashion until the user is satisfied with the last response provided by the system.

At this point, the user may indicate that the refined query is ready to be sent to a second generative AI system which the user has to pay for based upon a number of queries provided to the second query response system. However, because the user has refined the query, the query can be provided as a single query instead of multiple queries. After provision of the refined query, the user can interface with the second query response system by providing refinements or additional information if so desired.

Therefore, a system provides a technical improvement over traditional methods for utilizing query response systems. The system allows the user to utilize a first AI system to refine a query, build up a query context window, and/or create a query that provides a desired response and then transfer, once the user is satisfied with the query or prompt, to another AI system. The second AI system can the utilize the refined query as a prompt and provide a responsive output. This is particularly useful in a pay-as-you-go service model where the first AI system may be a free AI system or at least an AI system that is cheaper than the second AI system. Thus, the user can reduce the cost of use of a more expensive second AI system by providing a refined response instead of requiring the user to refine the query or prompt on the second AI system. However, such a technique may also be useful in the case of a smaller first AI system that takes less processing resources than a second larger AI system, in the case of a local first AI system as opposed to a remote second AI system, and/or the like. Accordingly, the system provides a system and method that is more efficient, more economical (either monetarily or resource-wise), and more user-friendly than conventional techniques that require a user to utilize a single AI system.

The illustrated example embodiments will be best understood by reference to the figures. The following description is intended only by way of example, and simply illustrates certain example embodiments.

While various other circuits, circuitry or components may be utilized in information handling devices, with regard to smart phone and/or tablet circuitry 100, an example illustrated in FIG. 1 includes a system on a chip design found for example in tablet or other mobile computing platforms. Software and processor(s) are combined in a single chip 110. Processors comprise internal arithmetic units, registers, cache memory, busses, input/output (I/O) ports, etc., as is well known in the art. Internal busses and the like depend on different vendors, but essentially all the peripheral devices (120) may attach to a single chip 110. The circuitry 100 combines the processor, memory control, and I/O controller hub all into a single chip 110. Also, systems 100 of this type do not typically use serial advanced technology attachment (SATA) or peripheral component interconnect (PCI) or low pin count (LPC). Common interfaces, for example, include secure digital input/output (SDIO) and inter-integrated circuit (I2C).

There are power management chip(s) 130, e.g., a battery management unit, BMU, which manage power as supplied, for example, via a rechargeable battery 140, which may be recharged by a connection to a power source (not shown). In at least one design, a single chip, such as 110, is used to supply basic input/output system (BIOS) like functionality and dynamic random-access memory (DRAM) memory.

System 100 typically includes one or more of a wireless wide area network (WWAN) transceiver 150 and a wireless local area network (WLAN) transceiver 160 for connecting to various networks 155 (e.g., telecommunications networks, wireless Internet devices (e.g., access points), cloud networks, remote networks, local networks, etc.). Additionally, devices 120 are commonly included, e.g., a wireless communication device, external storage, camera, microphone, external storage, etc. System 100 often includes a touch screen 170 for data input and display/rendering. System 100 also typically includes various memory devices, for example flash memory 180 and synchronous dynamic random-access memory (SDRAM) 190.

Figure 2:
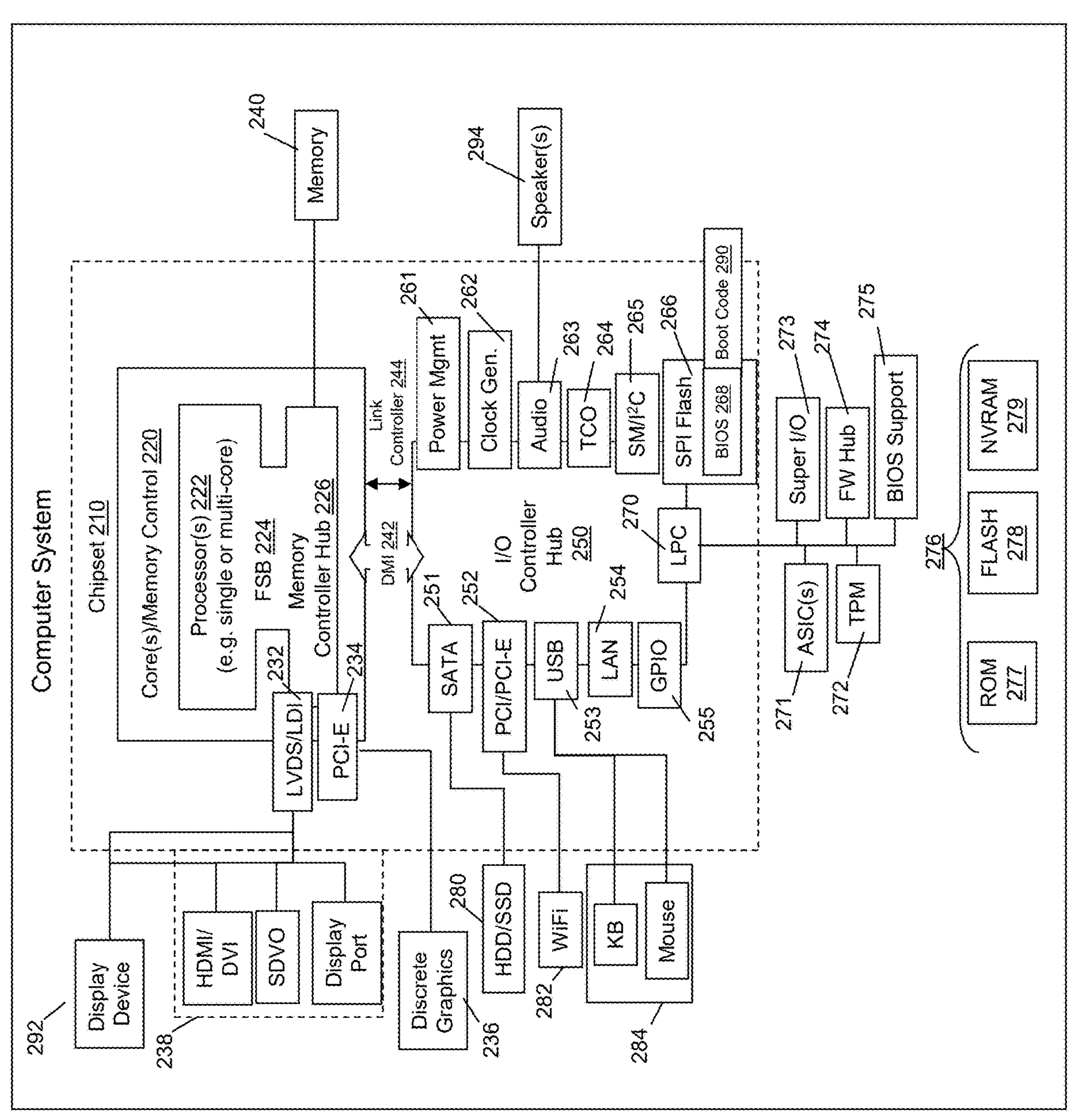
FIG. 2 illustrates another example of information handling device circuitry.

FIG. 2 depicts a block diagram of another example of information handling device circuits, circuitry, or components. The example depicted in FIG. 2 may correspond to computing systems such as personal computers, or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer. The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture. One or more processors 222 comprise internal arithmetic units, registers, cache memory, busses, I/O ports, etc., as is well known in the art.

In FIG. 2, the memory controller hub 226 interfaces with memory 240 (for example, to provide support for a type of random-access memory (RAM) that may be referred to as "system memory" or "memory"). The memory controller hub 226 further includes a low voltage differential signaling (LVDS) interface 232 for a display device 292 (for example, a cathode-ray tube (CRT), a flat panel, touch screen, etc.). A block 238 includes some technologies that may be supported via the low-voltage differential signaling (LVDS) interface 232 (for example, serial digital video, high-definition multimedia interface/digital visual interface (HDMI/DVI), display port). The memory controller hub 226 also includes a PCI-express interface (PCI-E) 234 that may support discrete graphics 236.

In FIG. 2, the I/O hub controller 250 includes a SATA interface 251 (for example, for hard-disc drives (HDDs), solid-state drives (SSDs), etc., 280), a PCI-E interface 252 (for example, for wireless connections 282), a universal serial bus (USB) interface 253 (for example, for devices 284 such as a digitizer, keyboard, mice, cameras, phones, microphones, storage, other connected devices, etc.), a network interface 254 (for example, local area network (LAN)), a general purpose I/O (GPIO) interface 255, a LPC interface 270 (for application-specific integrated circuit (ASICs) 271, a trusted platform module (TPM) 272, a super I/O 273, a firmware hub 274, BIOS support 275 as well as various types of memory 276 such as read-only memory (ROM) 277, Flash 278, and non-volatile RAM (NVRAM) 279), a power management interface 261, a clock generator interface 262, an audio interface 263 (for example, for speakers 294), a time controlled operations (TCO) interface 264, a system management bus interface 265, and serial peripheral interface (SPI) Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling device circuitry, as for example outlined in FIG. 1 or FIG. 2, may be used in devices such as tablets, smart phones, personal computer devices generally, and/or electronic devices, which may be used to access the query response system by a user and/or may be used to support or contain the query response system. For example, the circuitry outlined in FIG. 1 may be implemented in a tablet or smart phone embodiment, whereas the circuitry outlined in FIG. 2 may be implemented in a personal computer embodiment.

Figure 3:
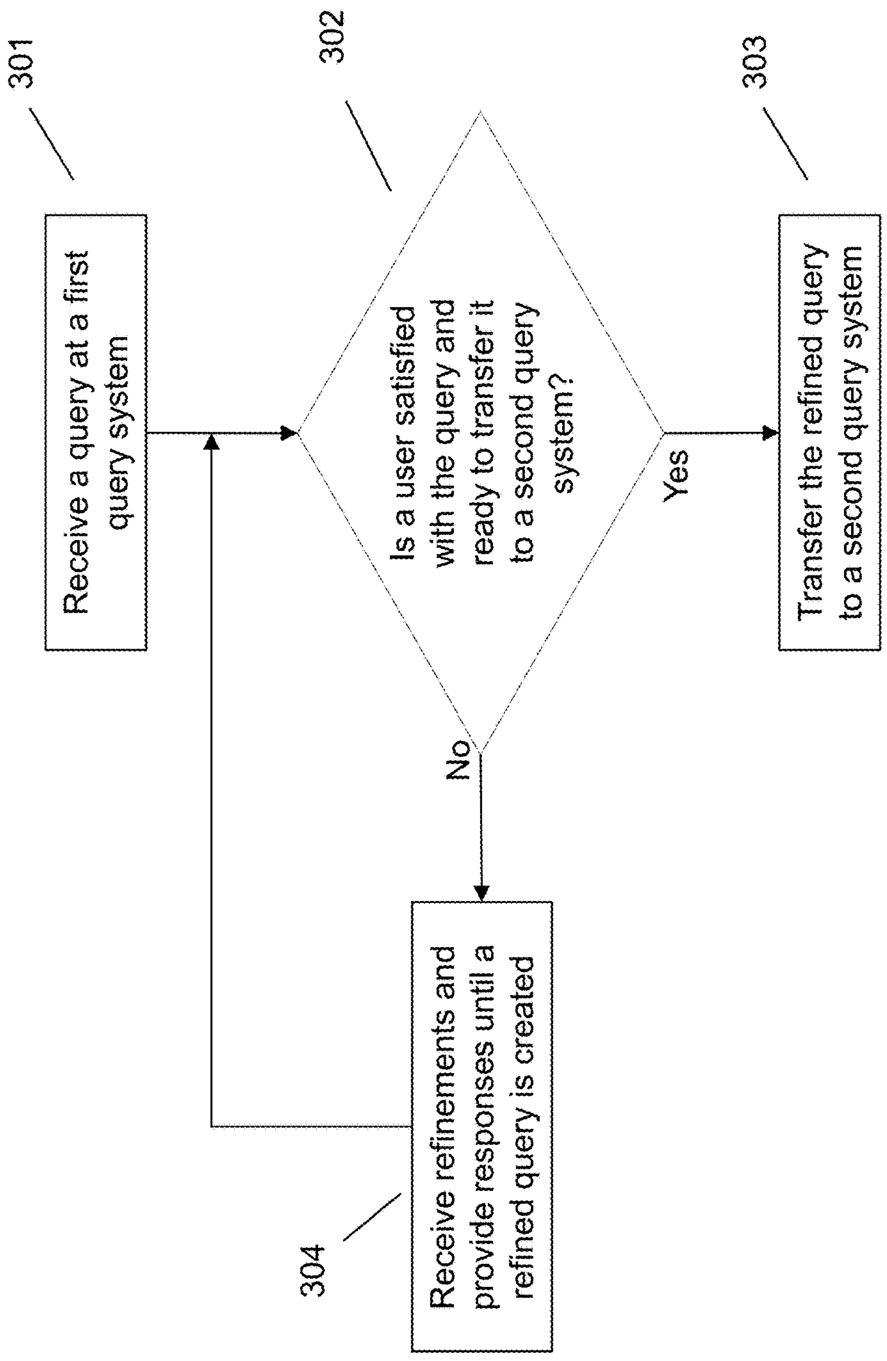
FIG. 3 illustrates an example method for creating a refined query from a query received by a user based upon refinements provided by the user to responses from a first query response system and transferring the refined query to a second query response system.

FIG. 3 illustrates an example method for creating a refined query from a query received by a user based upon refinements provided by the user to responses from a first query response system and transferring the refined query to a second query response system. The method may be implemented on a system which includes a processor, memory device, output devices (e.g., display device, printer, etc.), input devices (e.g., keyboard, touch screen, mouse, microphones, sensors, biometric scanners, etc.), image capture devices, and/or other components, for example, those discussed in connection with FIG. 1 and/or FIG. 2. While the system may include known hardware and software components and/or hardware and software components developed in the future, the system itself is specifically programmed to perform the functions as described herein to transfer refined queries to a different query response system. Additionally, the query response refinement and transfer system includes modules and features that are unique to the described system.

The query response refinement and transfer system may be activated in order to receive queries from a user, respond to the queries, refine the queries, and then transfer the refined queries to a second query response system. The system may include the query response systems or may interface with the query response systems. In other words, activating the query response refinement and transfer system may include activating a user interface that will receive the queries and display the responses with the query response systems running in conjunction with the query response refinement and transfer system. On the other hand, a user may access one or more query response systems and that access causes the query response refinement and transfer system to be activated. The system may then run in the background monitoring the query response systems and the user in order to determine when a refined query should be transferred to another query response system and facilitate the transfer of the refined query and any other information that will be transferred.

Thus, activation of the query response refinement and transfer system may be a manual activation of the query response refinement and transfer system and/or an automatic activation of the query response refinement and transfer system. Manual activation of the system may include a user opening an application associated with the query response refinement and transfer system, the user accessing the computing system associated with the query response refinement and transfer system, and/or the user otherwise providing input to the query response refinement and transfer system. The automatic activation of the query response refinement and transfer system may be based upon the detection of a trigger event indicating that the system should be activated. Example trigger events include a user accessing a query response system that is accessible by the query response refinement and transfer system, detection of a user providing a query to a query response system, detection of the user attempting to transfer a query from one query response system to another query response system, activation of software or an application utilizing the query response refinement and transfer system, and/or the like.

The query response refinement and transfer system may be made of multiple systems or modules that communicate together to make up the query response refinement and transfer system or may be a single system. The query response refinement and transfer system may be a standalone system, may be accessible through other computing devices, and/or a combination thereof. For example, the query response refinement and transfer system may be a standalone system that can be accessed by a user and/or may be or provide an application that is accessible by a user on another computing device. The query response refinement and transfer system may be accessible using any type of computing device, for example, personal computer, laptop computer, smartphone, tablet, smartwatch, head-mounted display, smart television or other smart appliance, augmented reality device, virtual reality device, and/or the like.

Thus, the query response refinement and transfer system may be accessible locally using a computing device where the query response refinement and transfer system is installed and/or may be accessible remotely through another computing device. For example, the query response refinement and transfer system may be accessed by a user using a device that communicates with the query response refinement and transfer system to receive queries from a user, receive query refinements from a user, provide responses to queries to the user, access user profiles, and/or the like. However, the query response refinement and transfer system may be located and operate on a different information handling device as compared to the device being utilized by the user to perform the described steps.

The receipt of and response to queries can be provided as a service to other entities or companies. In other words, the query response refinement and transfer system could be stored on a server or network of a company and the system could receive and respond to queries received from users, create a refined query, and transfer the query to another query response system for other companies or entities, with the other companies or entities paying for the creation of refined queries or the transfer of refined queries to another system or other use of the query response refinement and transfer system.

The query response refinement and transfer system may have an associated graphical user interface. The graphical user interface may be provided on a display or monitor, which may or may not be associated with the query response refinement and transfer system. In other words, the query response refinement and transfer system may have a dedicated display or monitor or may be accessible using any display or monitor. In either case, the query response refinement and transfer system may provide instructions to generate and display the graphical user interface on the display device being used to access the query response refinement and transfer system. The graphical user interface may also be updated and managed based upon instructions provided by the query response refinement and transfer system. In other words, the query response refinement and transfer system generates and transmits instructions to create and update the graphical user interface.

The graphical user interface may include a plurality of tabs, windows, and/or unique interfaces. The graphical user interface may include graphical user interface icons or elements. Graphical user interface icons or elements may include static non-selectable elements (e.g., headers, footers, logos, global information areas, graphics, etc.), dynamic non-selectable elements (e.g., local information areas applying to a specific element, dynamic graphics, information areas that update based upon the information provided therein, indicators, statistics displays, etc.), static selectable elements (e.g., radio buttons, menu icons, selectable indicators, etc.), dynamic selectable elements (e.g., form field input areas, pull-down menus, pop-up windows, etc.), and/or any other elements that may be found in a graphical user interface.

The graphical user interface may provide a section where the user can provide input, for example, the query or prompt to which the user wants the query response system to respond. This section may be a large free-form section, a small free-form section, a section having drop down options, a section having radial buttons, and/or the like, or a combination thereof. The graphical user interface may also provide a section for display of responses by the query response system. These sections may be set up like a typical query response system. In other words, these sections may have a similar look and feel to traditional query response system. Thus, the look of the graphical user interface may vary based upon the type of query response system. For example, if the query response system is a search engine, the look of the graphical user interface may appear to be more similar to traditional search engines. As another example, if the query response system is a generative AI system, the look of the graphical user interface may appear to be more similar to a traditional generative AI system. As a final, non-limiting example, if the query response system is a network search feature, the look of the graphical user interface may appear to be more similar to a traditional network search feature.

The graphical user interface may also include an input area that facilitates the transfer of a refined query (and any other information) from a first query response system to a second query response system. The refined query and any other information is also referred to as content for ease of readability. This input area may include a selector that corresponds to transferring the content from one query response system to another. For example, the selector may be identified as a "draft" and "final" mode, where the first query response system is associated with the "draft" mode and the second query response system is associated with the "final" mode. The selector may also cause the graphical user interface to switch from one visual to another visual. For example, the graphical user interface may change from a graphical user interface associated with the first query response system to a graphical user interface associated with the second query response system. The selector may include, but is not limited to, a visual switch, a radial button, a free-form section where the user provides a word or indicator that indicates the content should be transferred, an icon, a pull-down menu, and/or the like. It should also be noted that while a first and second query response system are discussed, the disclosure is not solely limited to two query response systems. Rather, the system can interface with or provide multiple query response systems. Thus, first and second refer to an order of operation and not a specific number of query response systems.

The graphical user interface may allow a user to provide input identifying information to be used by the query response refinement and transfer system. For example, the query response refinement and transfer system may utilize a user profile, historical information, query response system profile, and/or the like, to identify how to treat a query that has been received from the user, when a refine query has been created, when content should be transferred, to what query response system content should be transferred, the default query response system, and/or the like. The graphical user interface may allow for creation of or access to these profiles, historical information, and/or the like, by allowing a user to input information regarding user preferences, query response system preferences, and/or the like. As will be discussed in more detail, the use of user provided information is not the only way that the profile and/or historical information can be created. The query response refinement and transfer system can then utilize these inputs to create the profile(s), store the historical information, identify when content should be transferred, and/or the like.

A user could also use the graphical user interface to adjust information within the profile(s), historical information, and/or the like. Additionally, or alternatively, the user can input a location of information related to one or more of the profiles, historical information, and/or the like, provide a file corresponding to information related to the information, and/or the like, within the graphical user interface. Input may be provided by the user using any type of input modality, including, but not limited to, mechanical input (e.g., keyboard input, mouse input, etc.), touch input, audible or voice input, gesture input, haptic input, thought input, and/or the like.

The graphical user interface may also provide displays that display information of the profiles, information of query response systems, and/or the like. The displays could also provide recommendations by the system related to how a query or prompt could be modified to make it better. It should be noted that the information to be used by the query response refinement and transfer system and information provided by the query response refinement and transfer system can be different for different applications, different computing systems, different users, and/or the like. Thus, the information corresponding to input or output of the query response refinement and transfer system are not always the same. However, the query response refinement and transfer system may have default or system-wide settings that are the same across different users, systems, applications, and/or the like, until the information is adjusted or otherwise changed.

It should be noted that different users may configure the graphical user interface per their preferences. Thus, the graphical user interface layout and configuration may be different between users. How much a user can configure the layout may be restricted or set by a system administrator and/or the like. Additionally, different users or different user roles may have different levels of access, which may also change how and what information is displayed. Thus, different graphical user interfaces may be displayed by the system.

The query response refinement and transfer system may utilize one or more artificial intelligence models in creating a refined query and transferring the refined query and other information ("content") to a different query response system. Artificial intelligence models could be designed to provide responses to queries and refinements, determine when content should be transferred, determine to what system content should be transferred, provide input to make queries and/or refinements better, or any other steps within the described system. Artificial intelligence models may also be used for steps within a step. For example, a model could be utilized to provide responses to queries in order to create a refined query, perform natural language processing to analyze a query received, identify how content should be aggregated to be transferred to a query response system, and/or the like. For ease of readability, the majority of the description will refer to a single artificial intelligence model. However, it should be noted that an ensemble of artificial intelligence models or multiple artificial intelligence models may be utilized. Additionally, the term artificial intelligence model within this application encompasses neural networks, machine-learning models, deep learning models, artificial intelligence models or systems, and/or any other type of computer learning algorithm or artificial intelligence model that may be currently utilized or created in the future.

The artificial intelligence model may be a pre-trained model that is fine-tuned for the query response refinement and transfer system or may be a model that is created from scratch. Since the query response refinement and transfer system is used in conjunction with creating a refined query and transferring the refined query to another query response system, some models that may be utilized by the system are image analysis models, audio analysis models, other analysis models, entity identification models, similarity identification models, language models, large language models, filtering models, classification models, and/or the like. The model may be trained using one or more training datasets. Additionally, as the model is deployed, it may receive feedback to become more accurate over time. The feedback may be automatically ingested by the model as it is deployed. For example, as the model is used to perform the described method, if a user modifies predictions that were made by the model, provides feedback regarding a prediction, or otherwise provides some indication that the predictions or selections made by the model may be incorrect, the feedback can be utilized to better train the model, be placed into a data storage location accessible and usable by the model, or otherwise improve the accuracy of the model.

On the other hand, as the model makes predictions in connection with performing the described steps, and no changes are made to the resulting prediction, the model system may utilize this as feedback to make the model better. This may be referred to as reinforcement training where a prediction that was made by the model is reinforced as the correct prediction. Training the model may be performed in one of any number of ways including, but not limited to, supervised learning, unsupervised learning, semi-supervised learning, training/validation/testing learning, and/or the like.

As previously mentioned, an ensemble of models or multiple models may also be utilized. Some example models that may be utilized are variational autoencoders, generative adversarial networks, recurrent neural network, convolutional neural network, deep neural network, autoencoders, random forest, decision tree, gradient boosting machine, extreme gradient boosting, multimodal machine learning, unsupervised learning models, deep learning models, transformer models, inference models, and/or the like, including models that may be developed in the future. The chosen model structure may be dependent on the particular task that will be performed with that model.

The query response refinement and transfer system may include different components for carrying out different functions of the system, including different steps to be performed. These components may be hardware components or software components. Some hardware devices or components that may be utilized by the query response refinement and transfer system include input devices that may be utilized to receive input from the user, for example, mechanical input modalities (e.g., keyboard, mouse, etc.), touch input devices, gesture input devices, electromyography input devices, audio input devices, image capture devices, and/or the like. Other hardware components may be utilized to provide output from the query response refinement and transfer system. For example, the query response refinement and transfer system may include speakers, displays or monitors, haptic output devices, audio output devices, and/or the like. Other hardware components may be included.

One software component includes the user profile that stores information related to the user and user preferences. The user profile may be unique to a user and may assist in determining how the system should treat queries and prompts received from the user, when content should be transferred from one query response system to another, what portions of the content should be transferred, and/or the like. The user profile may include user preferences. For example, the user may identify a default or preferred first query response system and a default or preferred second query response system. This preference may be based upon a query response system type. For example, the user could identify a default query response system to be used when a generative AI system is being used and identify a default query response system to be used when a search response system is being utilized.

The user profile may also identify what content is transferred when the refined query is transferred. The content may include the refined query. The content may also include additional information, for example, a query context window built during the query and response session, the original query, responses provided by the query response system, and/or the like. Thus, transferring the refined query may also include transferring a subset of additional information that is created or identified by the system as a user is interacting with the system. The subset of additional information may include the original query, refinements provided by the user during a query and response session, responses provided by the user during a query and response session, and/or the like. The content refers to the information that is transferred, regardless of whether that is only the refined query or also includes additional information.

What content is transferred may differ based upon various factors and what factors are utilized to identify what content is transferred can be identified by the user. Factors may include, but are not limited to, a device the user is utilizing, a response system type, a location of the user, characteristics of the response system, and/or the like. For example, the user may identify the content that should be transferred by clearing any content that has been previously added once a refined query is identified, and then presenting the refined query to the first query response system to make clean content to be transferred to the second query response system. The system may also identify what content should be transferred based upon the query and response session and prompts the user has provided within the session. The user profile may also identify other information that may be useful to the system when creating a refined query and transferring the refined query to another query response system. The system can also store historical information within the user profile, for example, information related to past queries and responses of the user.

The user may manually input data into the profile or the information within the profile may be populated by the system as the system learns about the user over time. For example, the system may utilize an artificial intelligence model to learn about the user, make correlations between information received about the user and refined queries and transference thereof, and/or the like. This information can be populated within the user profile for use by the system during subsequent query and response sessions. The user profile may also include other information about the user that seems to influence query and response sessions, for example, a device that the user is using during different sessions and instructions provided by the user, types or topics of queries and how they are treated by the system, a location where the user is located when providing queries and how they are treated by the system, and/or the like.

The system can also store other information, whether in a profile that might be related to an entity (e.g., a query response system, the user, other users, devices, etc.), or in a different data storage location. How and where the information is stored may be dependent on different factors, such as the information being stored, what the information corresponds to, default storage settings, user selected settings, entity selected settings, and/or the like. For example, the system may store historical queries and responses and any information related to that. As another example, the system may store query context windows that are identified during a query and response session. As a final, non-limiting example, the system may store information that was pulled from or accessed from a secondary source during a query and response session. Other information can be stored and what information is stored may be based upon different factors.

At 301, the system may receive a query from a user at a first query response system. The first query response system may be any type of system that can provide a response to a query from a user. Thus, the query response system may be any type of system that can accept a user query and then provide an output responsive to the query, for example, a generative AI system, another type of AI system, an Internet search query system, a data search query system, and/or the like. The query may be provided by a user utilizing any type of input modality, for example, a text-based input modality, an audio-based input modality, a visual-based input modality (e.g., provision of images, provision of gestures, provision of video, etc.), a haptic-based input modality, and/or the like. Regardless of how the query is provided by the user, the system may convert the query into a text-based input for provision to the first query response system. Thus, the system may utilize one or more techniques to convert, if necessary, the query into a text-based input. For example, the system may utilize an artificial intelligence model, a speech-to-text system, a gesture analysis system, an image analysis system, an entity recognition system, a natural language processing system, and/or the like, to convert the input to text, if needed.

It should be noted that some queries provided using a non-text-based modality may not be converted to text. For example, if the user is attempting to get the query response system to generate an image from an originally provided image, the image may not be converted to text. Thus, whether the input is converted to text may be dependent upon the query that is provided, the input modality that is being used, the type of query response system being utilized, and/or the like. Regardless of whether the query is converted to text, the query may be displayed within an input area of either the query response refinement and transfer system or the first query response system. Thus, what form the query can be placed within the input area may designate whether the query needs to be converted to a different form. It is also possible that the query could be converted to a different input type, for example, from text to audio, from a gesture to audio, and/or the like. Regardless of the query modality of type, the system may still allow the user to utilize a first query response system to refine a query and then transfer the refined query to the second query response system.

Receipt of the query may be within the graphical user interface of the query response refinement and transfer system. In this case, the query response refinement and transfer system may either have its own query response systems that it utilizes or it may interface with other query response systems. Alternatively, receipt of the query may be within a graphical user interface of the query response system. In this case, the query response system may interface with the query response refinement and transfer system. Thus, receipt of the query may be within an input area of the query response refinement and transfer system and/or within an input area of a query response system. Regardless of how the query is received, the query is provided to the first query response system, either directly or through the query response refinement and transfer system.

The query may be any type of query that can be provided by a user. Thus, the query may include a prompt, question, statement, and/or any other type of query that would result in something attempting to be returned by the query response system. In some cases, the query may result in no response being able to be provided by the query response system. For example, the query response system may be unable to find any results that are responsive to the query, the query response system is unable to understand the query and provide a response, and/or the like. However, this is still designated as a query since the query response system attempted to provide a response. The query may include a free-form query, a structured query, and/or the like, or a combination thereof. Thus, the user may be able to provide a free-form query within an input area, utilize a pull-down menu, radial buttons, and/or the like, to provide a structured query, provide a free-form query in addition to a structured query, and/or the like.

At 302, the query response refinement and transfer system may determine if the user is satisfied with the response and ready to send it to the second query response system. In response to the query received at 301, the first query response system provides a response to the query. The user may be unsatisfied with the response, may want to make modifications to the query based upon the response, may want to add additional information to the query based upon the response, and/or the like. To create a refined query, the user and system may perform an iterative process of the user providing refinements and the first query response system providing responses to the refinements. In response to the response provided by the first query response system, the user may provide refinements to the query.

Providing refinements may be performed using any of the input modalities discussed in connection with 301. It should be noted the refinements do not have to be provided using the same modality that was utilized to provide the original query. For example, the original query may be provided in a text-based format and the refinements could be provided using an audio-based modality. However, the refinements could be provided using the same input modality as the original query. Additionally, multiple refinements can be provided during the iterative process, these multiple refinements do not need to be all provided using the same input modality.

A refinement is utilized by the query response system to modify the response to the original query. A refinement can either include a modification to the original query or may include the provision of additional information that should be used by the query response system. For example, a user may indicate that some portion of the original query should be changed or modified and the query response system should provide a new response based upon the modified query. As another example, a user may provide additional information and indicate this additional information should be used in conjunction with the original query by the query response system to provide a new response. As a final, non-limiting example, the user may provide additional information and also may provide modifications to the original query.

A modification may include a change to information within the query, deletion of information contained within the query, and/or the like. The query response system will then use the modified original query and the additional information to provide a response. In the case of multiple iterations of refinements, each refinement may include one of a modification, additional information, and/or the like, or a combination thereof. Additionally, for multiple iterations, the user may make refinements to intermediary queries or refinements. For purposes of this disclosure, refinements to intermediary queries or refinements will be considered refinements to the original query. In other words, once the query response system has responded to a query provided by a user, either as the original query or as a refinement, the query response system will treat all prior queries and refinements as part of the original query.

Once a refinement is provided by the user to the first query response system, the first query response system provides a response to the refinement. The user can then provide additional refinements and the query response system will provide corresponding responses. This iterative process continues until the user is satisfied with the last response provided by the first query response system. Once the user is satisfied with the last response provided by the first query response system, the query response refinement and transfer system treats this as the refined query. The refined query may be the last query provided by the user or could be all or a subset of the queries provided by the user during the query and response session. It should be noted that the refined query may also be the original query. For example, if the user is satisfied with the response or otherwise wants to use the original query, the original query may be treated as the refined query. Thus, the user could identify the original query as the refined query. In this case, creating the refined query would simply include receiving an indication from the user that the original query should be treated as the refined query or that the original query should be transferred to the second query response system.

During the query and response session, which is the exchange between the user and the first query response system beginning with the original query and ending with the refined query, the system may build up or generate a query context window of information related to the exchange. In other words, the query response refinement and transfer system can generate a query context window associated with the query, refinements, and responses within the query and response session. To respond to the queries (the original query and any refinements), the first query response system may access information that is outside the query response system. For example, the query response system may employ a retrieval-augmented generation system which allows artificial intelligence models to access information that it would not normally have access to in order to optimize the output of the model. As another example, the query response system may have access to data storage locations, secondary data sources, and/or the like, which may include information that can be used or accessed by the first query response system.

As the first query response system accesses and pulls information in order to respond to the queries, the first query response system may identify the information accessed, the location of the information accessed, what information was obtained to formulate the response, and/or the like. This is part of the query context window that is built by the first query response system. Other information can also be stored or identified by the first query response system as part of the query context window including, but not limited to, time stamps associated with the queries received by the user, information related to the user (e.g., device, location of the user, etc.), information pulled from the user profile, and/or any other information related to the query and response session.

To determine, at 302, that a refined query has been created, the query response refinement and transfer system determines whether an indication has been received from a user that would indicate that the user wants the refined query sent to a second query response system. In other words, determining that a refined query has been created is based on a user input. Thus, it is the user who identifies when the query is refined to a point that the user is satisfied with. Accordingly, if the query response refinement and transfer system determines that a refined query has not been created at 302 because no indication of such has been provided by the user, the first query response system may continue to receive refinements and provide responses at 304 until a refined query has been created. In other words, the query response refinement and transfer system continues the iterative process at 304 until the user indicates that the query is in a refined query form. The user may also decide that the response provided by the first query response system is acceptable and may then decide not send the refined query to the second query response system. In this case, the process would simply end without transferring the refined query to a second query response system.

If, on the other hand, the query response refinement and transfer system determines at 302 that a refined query has been created (i.e., the user has indicated that the refined query should be transferred to the second query response system), the query response refinement and transfer system transfers the refined query from the first query response system to a second query response system at 303. The second query response system may be a query response system that is of the same type as the first query response system. However, the second query response system may have different characteristics or capabilities as compared to the first query response system. For example, the second query response system may utilize different processing resources, may have a cost associated with each use, may be located at a different data storage location as compared to the first query response system, may be able to provide responses having different characteristics than what can be provided using the first query response system, may have access to different information or data storage locations, and/or the like.

Within the graphical user interface, the first query response system may correspond to one mode of the query response refinement and transfer system and the second query response system may correspond to a second, different mode of the query response refinement and transfer system. For example, the first query response system may correspond to a "draft" mode of the query response refinement and transfer system and the second query response system may correspond to a "final" mode of the query response refinement and transfer system. As another example, the first query response system may correspond to a "first" mode of the query response refinement and transfer system and the second query response system may correspond to a "second" mode of the query response refinement and transfer system. As a final, non-limiting example, the first query response system may correspond to a "training" mode of the query response refinement and transfer system and the second query response system may correspond to a "implementation" mode of the query response refinement and transfer system.

The transferring of the refined query to a second query response system is different than an artificial intelligence (AI) cascade system. In an AI cascade system a query is moved from one AI system to another system based upon determining that the AI system is unable to process the query. In other words, in the AI cascade, the system determines that the query needs to be moved from one AI system to another AI system based upon the ability of the AI system to process a query. The present disclosure, on the other hand, transfers a query from a first query response system to a second query response system based upon an indication received from the user. The transference of the query is not related to the ability of the query response system to process and provide a response to a query, unlike in AI cascade systems. In other words, the user controls the transference of the query from one query response system to another query response system as opposed to AI cascade systems which make the decision to transfer the query from one AI system to another internally.

Thus, the transferring at 303 is responsive to receiving an indication from the user to transfer the refined query. The indication can be any type of indication and may be provided using any input modality type. Additionally, as previously mentioned, the graphical user interface can include a selector that causes the transference of the refined query from the first query response system to the second query response system. For example, the user may provide input to the selector, thereby indicating that the refined query should be transferred.

When transferring the refined query, the query response refinement and transfer system may transfer only the refined query or may also transfer additional information with the refined query. The information that is transferred will be referred to as content for ease of readability. It should be noted that the content transferred may only be the refined query or may also include any of the additional information. Additional information that may be included in the content includes, but is not limited to, the original query, the refinements, the responses provided by the first query response system, the query context window that was generated by the first query response system, and/or the like, or a combination thereof. The content may all be transferred as a single query into the second query response system. The content may also be broken up into multiple queries and provided to the second query response system. Whether the content is transferred as a single query or multiple queries may be based upon what content is being transferred, user preferences, query response system abilities, and/or the like.

Upon transferring the content, the query response refinement and transfer system may provide a confirmation to the user that the content was transferred. The confirmation may be in one or more forms including, but not limited to, a pop-up window, a change in a characteristic of the user interface (e.g., a change in color, a change in a font, a change in icons, etc.), a modification to the selector, and/or the like. The user may also be presented with a user interface that corresponds to the second query response system. It should be noted that the user interface could be the same between the first query response system and the second query response system. Thus, the user may not notice a visual difference between the user interface of the first query response system and the second query response system. Alternatively, the user interface may be associated with the query response refinement and transfer system and may not change upon transference of the query to the second query response system. Other factors may be present that do not cause the user interface to change.

The second query response system may then provide a response to the content that was transferred. The user can then interact with the second query response system as needed. In other words, once the content has been transferred to the second query response system, the user can interface with the second query response system as the user interfaced with the first query response system, if desired.

As an overall non-limiting example of the described system, a user may be utilizing a generative AI system as the query response system. For this example, the user is attempting to get the generative AI system to generate an image depicting a scene. In this example, the user utilizes a graphical user interface that is associated with the query response refinement and transfer system. The query response refinement and transfer system then provides input to query response systems in the background, so the user only has to access one application. While the user has a general idea of what they want the image to look like, the user is not entirely certain either what prompt would result in the desired image or exactly what they want the image to look like. Thus, the user understands that it will take multiple prompts to get the desired image. Accordingly, the user accesses a first, free generative AI system. The downside is that this system provides a lower resolution image than the user really wants. The user provides a first query or prompt to the first generative AI system. Upon receiving the output image, the user provides refinements, including both modifying the original prompt and adding additional information as the system provides responses to the original query and the refinements.

Once the user is satisfied with the image that has been provided by the first, generative AI system, the user provides input to a selector within the user interface. In this example, the selector is a switch icon with one side labeled as "draft" which corresponds to the first, free generative AI system in this example. The other side is labeled as "final" which corresponds to a second, pay-as-you-go generative AI system. When the user provides input to the selector, the selector moves from the "draft" side to the "final" side. This also causes the system to transfer the refined query (i.e., the last query that was provided to the free generative AI system) to the second generative AI system. In this example, the content that is transferred includes the refined query, the original query, and the refinements to the query. The second generative AI system treats the content as a single prompt and then provides a response based upon this single prompt. Thus, the user only pays for a single prompt that was provided to the second generative AI system.

While this is an illustrative example, it can be easily understood that similar techniques can be utilized with AI systems other than generative AI systems, Internet search query systems, search systems, virtual assistant systems, and/or any other system that can respond to a query provided by a user. Additionally, the first and second query response systems may have different characteristics that causes the user to want to use the two different systems. In the above example, there was a cost difference between the two query response systems. However, other factors could be an amount of processing resources utilized by the query response systems, a location of the query response systems (e.g., local, remote, cloud, etc.), data storage locations that are accessible by the query response systems, a time associated with the responses by the query response systems, and/or the like.

It will be readily understood that the components of the embodiments, as generally described and illustrated in the figures herein, may be arranged and designed in a wide variety of different configurations in addition to the described example embodiments. Thus, the more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

As will be appreciated by one skilled in the art, various aspects may be embodied as a system, method, or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device that are executed by a processor. A storage device may be, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random-access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage device is not a signal and is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. Additionally, the term "non-transitory" includes all media except signal media.

Program code embodied on a storage medium may be transmitted using any appropriate medium, including but not limited to wireless, wireline, optical fiber cable, radio frequency, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices, and program products according to various example embodiments. It will be understood that the actions and functionality may be implemented at least in part by program instructions. These program instructions may be provided to a processor of a device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, the method comprising:

receiving a query from a user at a first query response system;

creating, using the first query response system, a refined query by iteratively receiving, from the user, refinements to the query subsequent to responses provided by the first query response system; and transferring, responsive to receiving an indication from the user to transfer the refined query, the refined query from the first query response system to a second query response system, wherein the indication from the user comprises indicating that the user is satisfied with the refined query and wherein when the user is satisfied the iteratively receiving the refinements to the query is complete.

2. The method of claim 1, wherein the transferring comprises transferring the query and refinements to the second query response system as a single query.

3. The method of claim 1, wherein the creating comprises generating a context window associated with the query, refinements, and responses.

4. The method of claim 3, wherein the transferring comprises transferring the context.

5. The method of claim 1, wherein the transferring comprises transferring a subset, as selected by the user, of information comprising the query, the refinements, the responses, and the refined query.

6. The method of claim 1, comprising providing, to the user, an interface associated with the second query response system.

7. The method of claim 1, comprising providing a user interface for receipt of the query, receipt of the refinements, and provision of the responses.

8. The method of claim 1, comprising providing within a user interface of the first query response system a selector, and wherein the receiving an indication comprises receiving input at the selector.

9. The method of claim 1, wherein the first query response system corresponds to a first mode of a query response refinement and transfer system and the second query response system corresponds to a second mode of the query response refinement and transfer system.

10. The method of claim 1, wherein the query response system comprises an artificial intelligence system.

11. A system, the system comprising:

a processor;

a memory device that stores instructions that, when executed by the processor, causes the system to:

receive a query from a user at a first query response system;

create, using the first query response system, a refined query by iteratively receiving, from the user, refinements to the query subsequent to responses provided by the first query response system; and transfer, responsive to receiving an indication from the user to transfer the refined query, the refined query from the first query response system to a second query response system, wherein the indication from the user comprises indicating that the user is satisfied with the refined query and wherein when the user is satisfied the iteratively receiving the refinements to the query is complete.

12. The system of claim 11, wherein the transferring comprises transferring the query and refinements to the second query response system as a single query.

13. The system of claim 11, wherein the creating comprises generating a context window associated with the query, refinements, and responses.

14. The system of claim 13, wherein the transferring comprises transferring the context.

15. The system of claim 11, wherein the transferring comprises transferring a subset, as selected by the user, of information comprising the query, the refinements, the responses, and the refined query.

16. The system of claim 11, comprising providing, to the user, an interface associated with the second query response system.

17. The system of claim 11, comprising providing a user interface for receipt of the query, receipt of the refinements, and provision of the responses.

18. The system of claim 11, comprising providing within a user interface of the first query response system a selector, and wherein the receiving an indication comprises receiving input at the selector.

19. The system of claim 11, wherein the first query response system corresponds to a first mode of a query response refinement and transfer system and the second query response system corresponds to a second mode of the query response refinement and transfer system.

20. A product, the product comprising:

a computer-readable storage device that stores executable code that, when executed by a processor, causes the product to:

receive a query from a user at a first query response system;

create, using the first query response system, a refined query by iteratively receiving, from the user, refinements to the query subsequent to responses provided by the first query response system; and transfer, responsive to receiving an indication from the user to transfer the refined query, the refined query from the first query response system to a second query response system, wherein the indication from the user comprises indicating that the user is satisfied with the refined query and wherein when the user is satisfied the iteratively receiving the refinements to the query is complete.

* * * * *